UNITED STATES PATENT OFFICE.

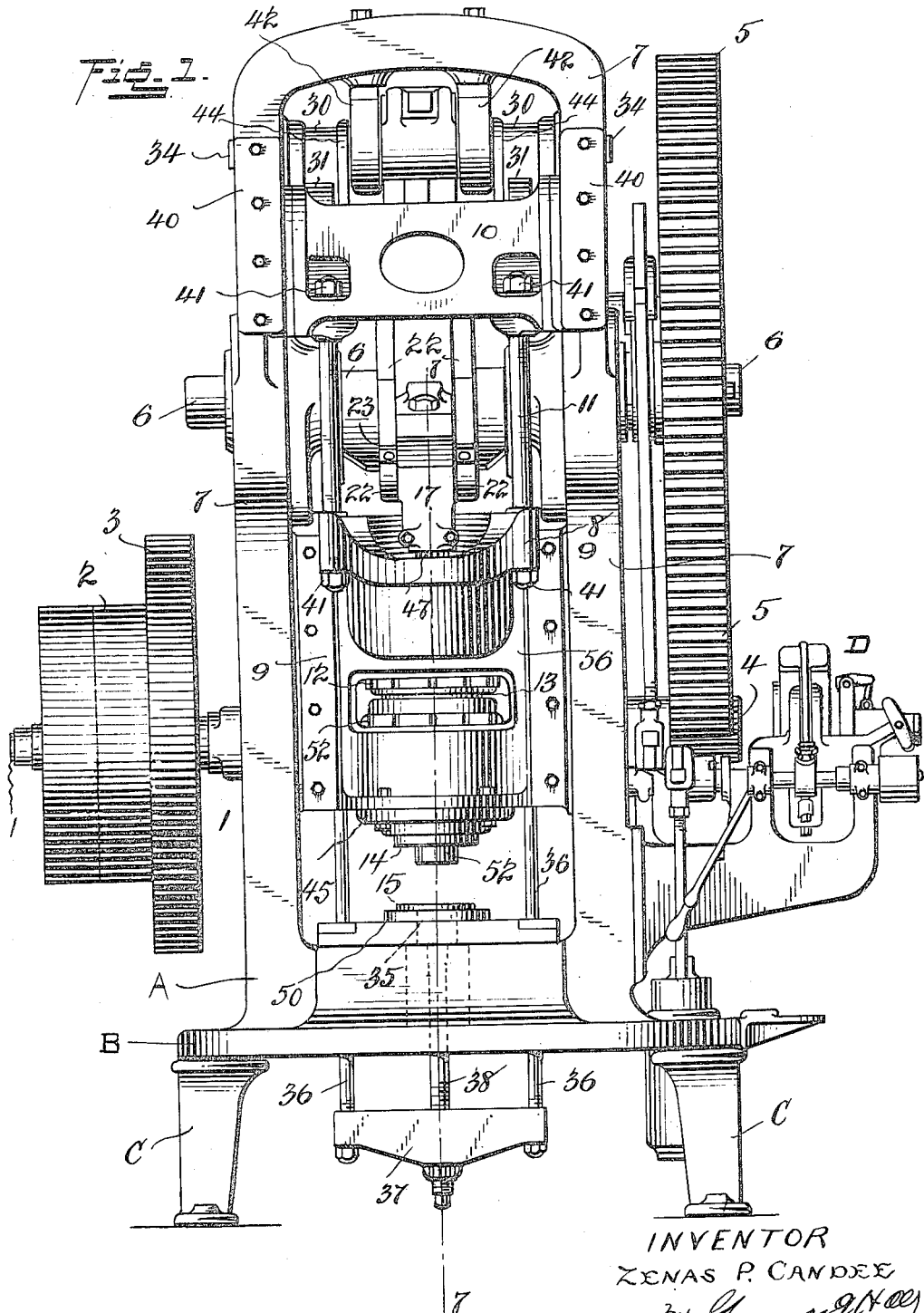

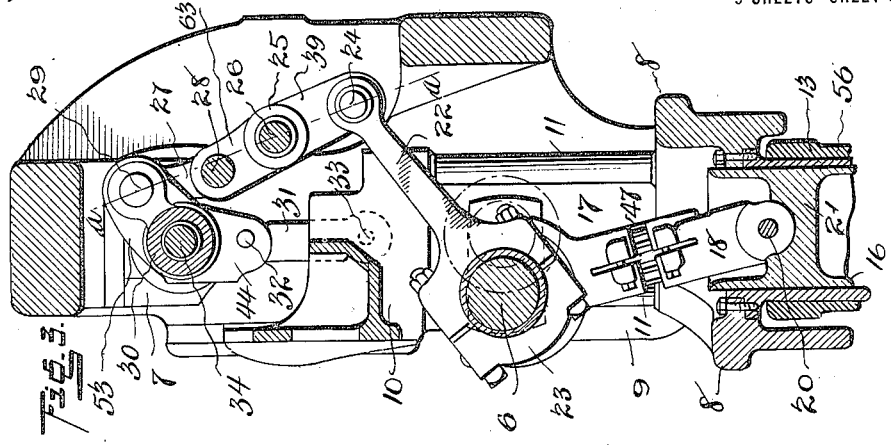
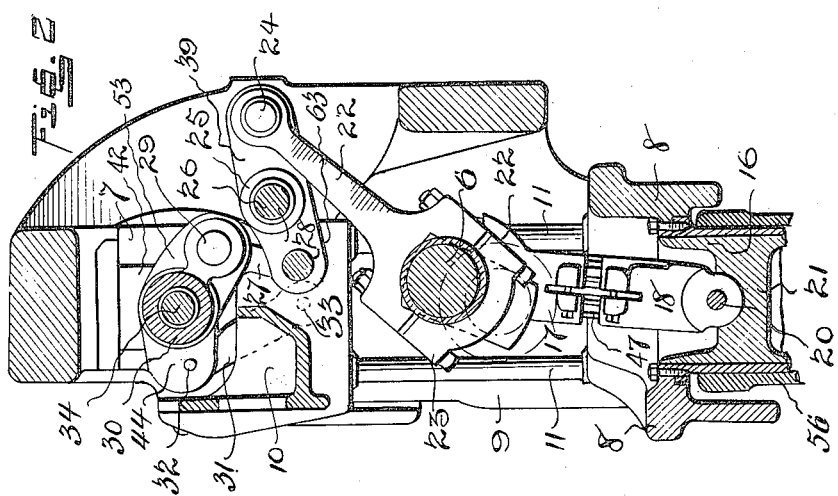
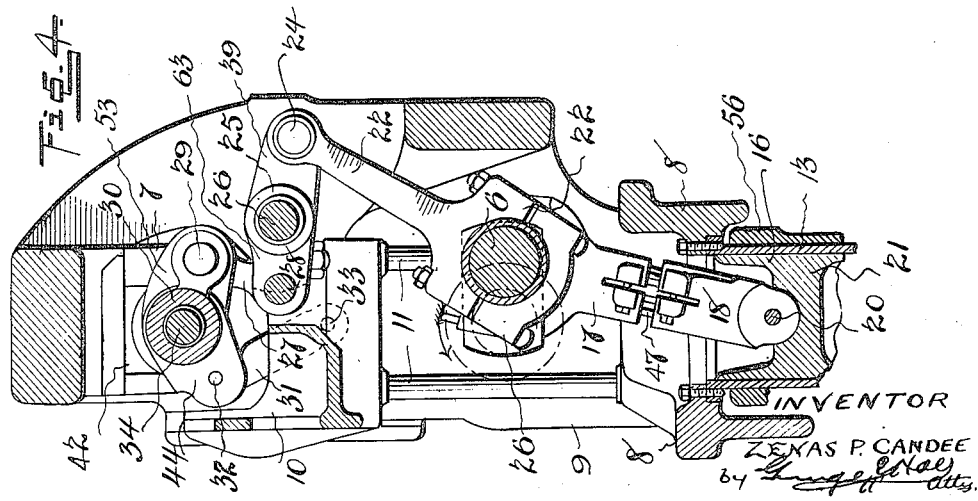

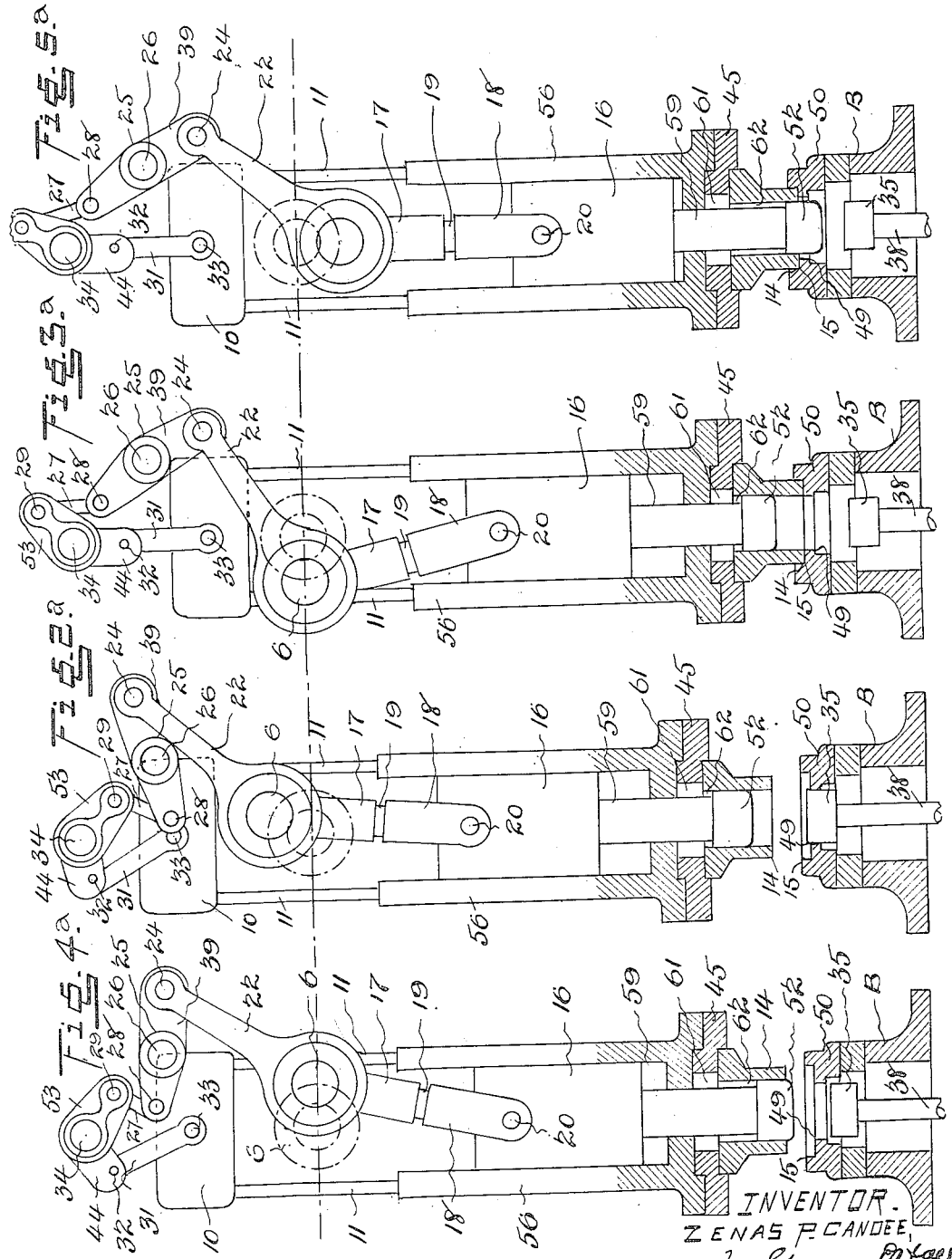

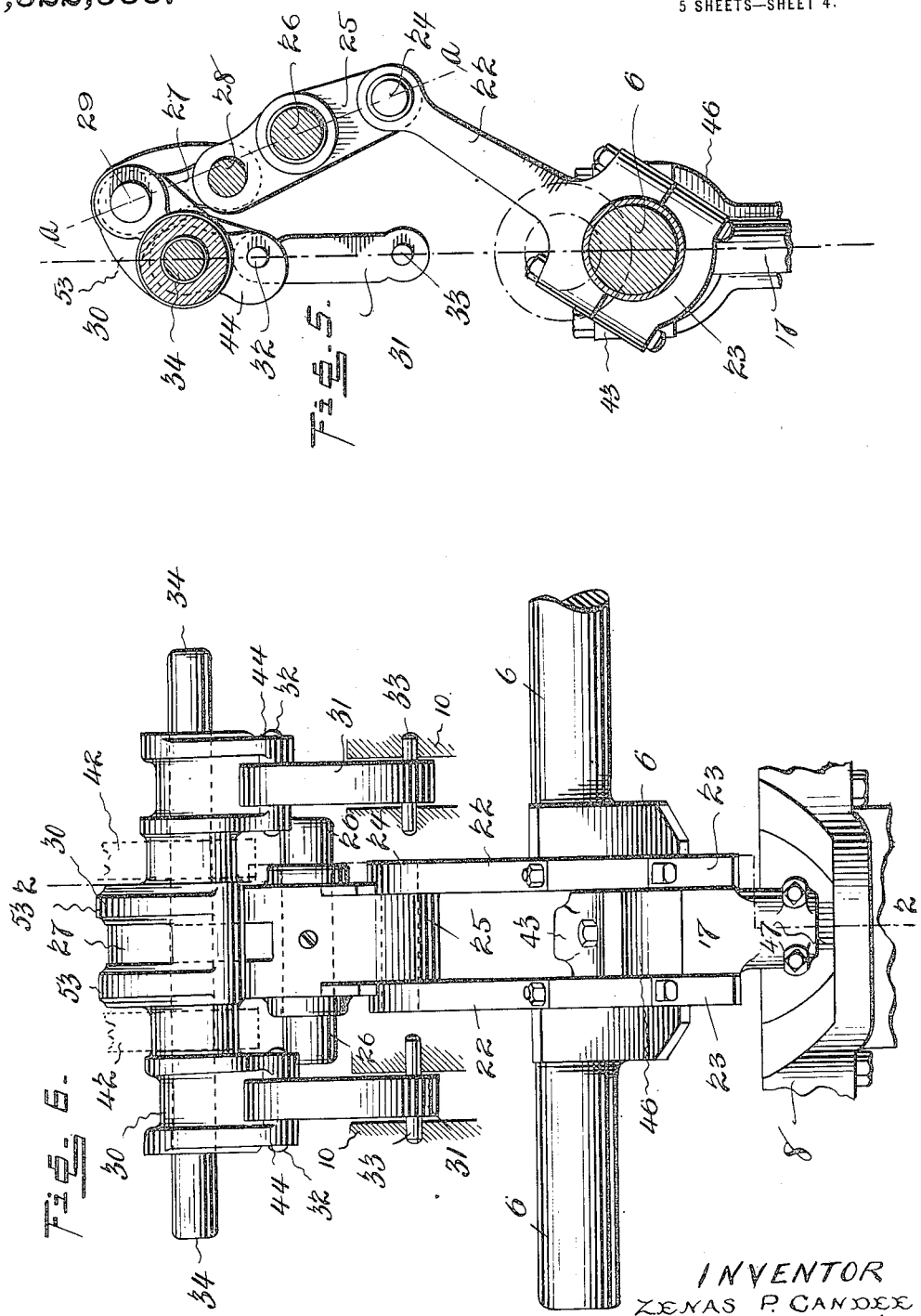

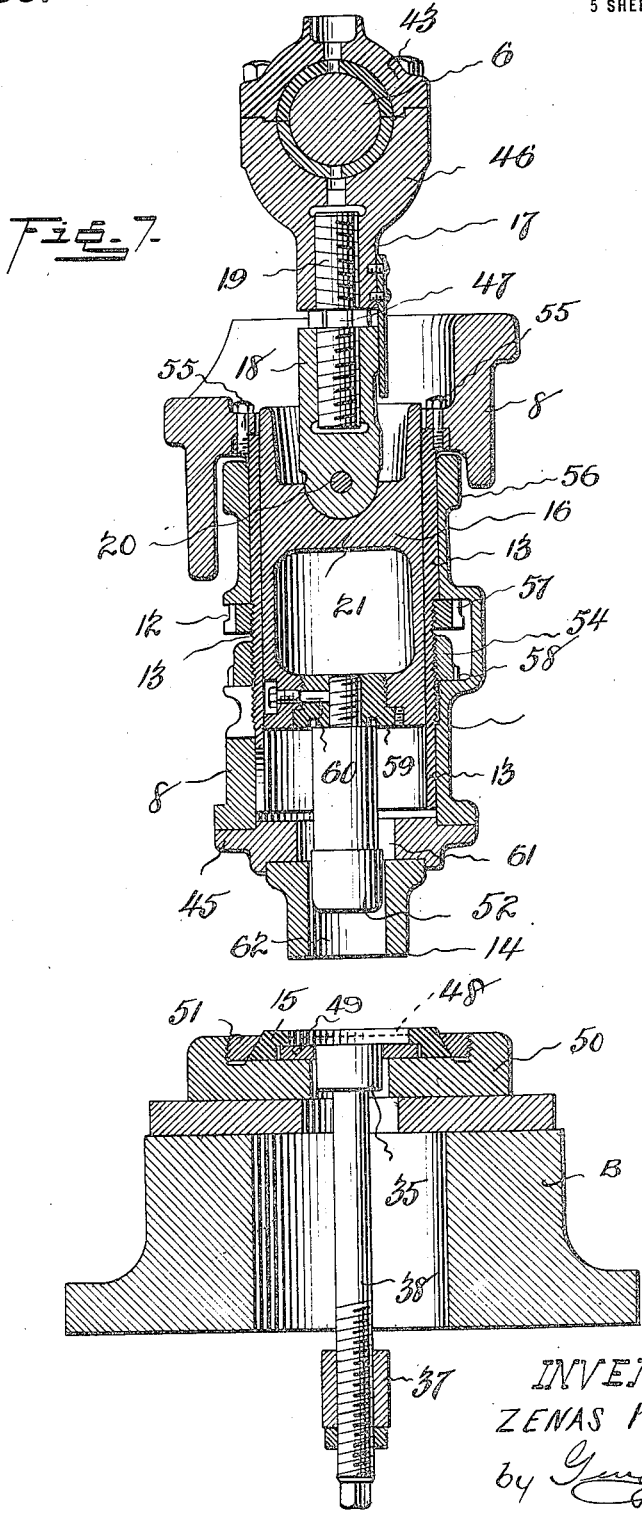

ZENAS P. CANDEE, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

POWER-TRANSMISSION MECHANISM.

1,322,533.  Specification of Letters Patent.  Patented Nov. 25, 1919.

Application filed January 15, 1918. Serial No. 211,951.

*To all whom it may concern:*

Be it known that I, ZENAS P. CANDEE, a citizen of the United States, residing at Waterbury, in the county of New Haven and State of Connecticut, have invented certain new and useful Improvements in Power-Transmission Mechanism, of which the following is a specification, reference being had therein to the accompanying drawings.

The present invention in its broadest aspect has relation to power transmission mechanism, whereby certain mechanical movements are derived or imparted for attaining useful results and such mechanism may be used advantageously with various kinds of machinery to which it is applicable, but for the purpose of illustration and exemplification of one use to which the mechanism may be put, the same is illustrated and described herein as being applied to a power or metal working press. In such application of the invention certain other improvements, forming part of the invention hereinafter set forth, are effected in the construction and arrangement of associated parts of the press in order to render the improved mechanism applicable and to derive all the advantages which may be attained therefrom.

One of the objects of the invention is to provide a mechanism which is designed to impart a given movement to one operative movable element of a machine independently of another movable element hereinafter termed the plunger or drawing gate, which latter member is associated with the first element referred to and hereinafter called the blanking or cutting gate. The blanking or cutting gate at a predetermined time, is brought to a state of rest while said mechanism and drawing gate are still in action, which may be either continuous or periodical under the control of the operator by means of suitable mechanism.

Another object of the invention is to design and arrange the improved power transmission mechanism symmetrically and substantially in alinement with relation to the member or members operated thereby so that advantages both in construction and operation are obtained.

Another object of the invention is to provide a setting or guiding support for the member or members operated by the improved mechanism, whereby one of such members, namely, the cutting gate, is maintained in a perfectly parallel position at all times, so that when said element is brought into contact with an abutting surface, such contact will be substantially uniform over the entire contact surface.

This invention having for its purpose, among other things, the accomplishment of those objects above enumerated, as well as others, consists in mechanism having certain details of construction and combinations of parts, as will be hereinafter described, and more particularly pointed out in the appended claims.

Referring to the drawings, in which like numerals of reference designate like parts in the several figures;

Figure 1 is a front elevation of a power press embodying my improved mechanism and arrangement of devices;

Fig. 2 is a detail sectional view of a portion of the mechanism taken upon line 2—2 of Fig. 6, showing the crank of the crank shaft, which operates the mechanism, at substantially its highest point and the other parts in a relative position, the gate members being also at substantially the highest point of their stroke;

Fig. 3 is a similar view showing the relative position of the crank shaft and some of the adjacent mechanism when the crank of the crank shaft is in an intermediate position and traveling downwardly;

Fig. 4 is a similar view showing the relative position of the crank shaft and some of the adjacent mechanism when the crank of the crank shaft is in an intermediate position traveling upwardly;

Fig. 5 is a similar view on an enlarged scale showing the relative position of the crank shaft and some of the adjacent mechanism when the crank of the crank shaft has reached its lowermost position;

Fig. 6 is a fragmentary, detail elevation of the crank shaft and the mechanism above referred to; and Fig. 7 is a fragmentary enlarged sectional view, taken upon line 7—7 of Fig. 1, showing details of the gates and parts adjacent thereto, including the bed of the machine, dies, and knockout mechanism.

Figs. 2ª, 3ª, 4ª and 5ª are outlined illustrations, partly in section, showing the relative positions of the die, blank holder and work ejector, with reference to the important positions and the main crank shaft of the machine during a cycle of operation, and these figures correspond respectively with Figs. 2, 3, 4 and 5.

My invention is shown in the drawings as applied to a power press, having a frame A, the base B of which rests upon suitable legs C, a power shaft 1, driven through a pulley 2 and upon which is the fly wheel 3. A pinion 4 on the shaft 1 transmitting power to a gear 5 fixed on a crank shaft 6, and both the shaft 1 and the crank shaft 6 are journaled in the uprights or standards 7 of the frame A.

According to my invention, the construction and arrangement of the elements of the press and the mechanism for operating them, as well as the construction of the press itself, so far as it relates to said elements and mechanism, constitute a part or parts of my invention, and differ from constructions heretofore employed, wherein such operative elements are generally operated by separate and independent cranks or crank shafts through double toggle transmission mechanism located mainly outside of the frame of the press and each part or section of said mechanism having a separate or individual supporting shaft and a separate or individual rock shaft. With my invention, both the cutting or blanking gate and the plunger or drawing gate are operated by one crank shaft and double toggle power transmission mechanism which imparts movement to the operative elements, is located mainly within the frame and at each side of the working elements of the machine whereby an equilibrium in the distribution of power is established. This location of the mechanism is possible because of the use of a single or common operating rock shaft and offers a decided advantage over known constructions and arrangements, wherein the toggle or power transmission mechanism is located outside the frame of the press and entirely at one side of the working elements thereof whereby an unequal distribution of power is apt to occur. It is also an obvious advantage to actuate the gates or operative elements of a press by the same crank shaft instead of separately and from different crank shafts, as heretofore.

According to my invention, and as illustrated in the drawings, the gate mechanism in part consists of a head member 8, to which is secured a sleeve 13 by any preferred means, the means herein shown being the bolts 55, a cutting or blanking gate 56 adjustably mounted upon said sleeve and locked in its adjusted positions by the nuts 12 and 54, threaded upon said sleeve, the former engaging a shoulder 57 on said gate and the latter a shoulder 58. The gate 56 is slidably mounted on the uprights or standards 7, being held against outward movement by the secured caps 9. It is further guided by the extension or auxiliary gate 10 similarly mounted to slide on said standards against the caps 40 and joined to the head member 8 by the tie-rods 11 having the nuts 41 threaded thereon.

Attached to the lower end of the gate 56 is the punch holder 45, within which is secured the cutting punch 14. By reason of the relative adjustment and positioning of the cutting or blanking gate 56 upon the sleeve 13 provision is made for operating upon metal of varying thicknesses.

The plunger or drawing gate 16 is slidably mounted within the sleeve 13 and in the lower end thereof is a plug 59, providing a support for the drawing punch 52 that is threaded therein and held against relative movement by the screw 60. This punch passes through an opening 61 in the punch holder 45 and the opening 62 in the punch 14. The plunger or drawing gate 16 is operated by power direct from the crank shaft 6 through the medium of a connecting device, one member 17 thereof having a head 46, with a cap 43 secured thereto, journaled on the crank of said crank shaft. The other member 18 is hinged to the gate 16 by a wrist pin 20 in the integral cross head 21 and both of said members 17 and 18 are united by a screw 19 having a threaded engagement with each, one thread being a left hand and the other a right hand thread, whereby relative adjustment of the members 17 and 18 toward and away from each other is obtained by manipulation of the integral intermediary nut collar 47, as is usual with this class of mechanism.

Fixed on the base B of the frame is a die block 50 within which is secured a cutting die 15 and a drawing die 49, by means of a threaded ring 51. A knockout mechanism for ejecting the finished article from the die mechanism comprises a yoke 37 connected with and actuated from the cutting or blanking gate 56, by the rods 36, and an ejector rod 38 threadably secured in the yoke 37 and having a head 35 thereon at the end adjacent to the dies.

The tools of this press as shown herein, comprising the dies, punches, etc., are merely for the purpose of illustration and form no part of my present invention, as the shape, size, method of mounting them, etc., can be and are varied indefinitely.

Mounted in the uprights or standards 7, and preferably secured, is the shaft 34, the axis of which is substantially parallel with and, in an upright machine, as shown, immediately over that of the crank shaft 6, and upon which is journaled the rock member 30, from which project a plurality of radial arms, four of such arms being arranged in two sets of two each, and all being parallel and extending in the same radial direction, these arms being designated by the numerals 44 and an intermediate set of arms projecting in a different radial direction, designated by the numerals 53. An exterior support, for the rock member 30, to take and relieve the strain therein in a direction away from the crank shaft, is provided by the journal blocks 42 fixed to the top of the frame A and contacting with the rock member between the arms 53 and arms 44. Mounted in a fixed position in the frame A, with its axis substantially parallel with the crank shaft 6 and the shaft 34, and at a point between said shafts but upon one side of a line passing through the axis thereof, is the shaft 26, upon which is rotatably suspended the rock lever 25 having the arms 39 and 63 that project therefrom upon opposite sides of its center. A link 27 joins the arms 53 on the rock member 30 with the arms 63 of the rock lever 25, by means of a pin 29 through the first mentioned arms and a pin 28 through the last mentioned arms.

The link 27 provides a substantially floating connection between the rock member 30 and the rock lever 25, consequently, at a definite period during a cycle of operation, when said rock member and rock lever are in certain relative positions, motion is not transmitted from one to the other, through said link.

Forming an operative connection between the crank shaft 6 and the rock lever 25 are the companion connections 22 upon both sides of the member 17 of the plunger or drawing gate connection. Each of these connections 22 has a cap 23 at one end where it is journaled to the crank shaft and pivotally joined at the other end to the arm 39 of said rock lever by the pin 24. The two links 31, arranged so that one link is upon each side of the center of the line of motion of the plungers, are pivotally connected with the auxiliary gate 10 by the pins 33 and to the arms 44 upon the rock member 30 by the pins 32.

The cutting or blanking gate 56 is indirectly operated by the crank shaft through the double acting toggle mechanism illustrated in detail in Figs. 2 to 6 inclusive and 2ª to 5ª, inclusive, wherein the several elements are shown in the positions they assume in relation to the gate during various stages of its operation.

In Fig. 2 both of the gates are illustrated at nearly the limit of their up stroke.

The plunger or drawing gate 16, owing to its direct connection with the crank of the crank shaft 6 is in a position solely determined by that of said crank, two of its positions intermediate of its extreme up and down positions being shown in Figs. 3 and 4. The relative position of the cutting or blanking gate 56 is, however, in part dependent upon the intermediate mechanism above described that is set in motion by said crank shaft. In Fig. 3 this mechanism is in such position that the connections 22 have moved said rock lever 25 upon its axis, the shaft 26, so that the link 27 has actuated the rock member 30, the links 31, and the said cutting or blanking gate, which is practically in its down position. At this time the pins 32 and 33 are in substantially the same vertical plane and the axis of the pin 28 has passed beyond an imaginary line extending through the axis of the pins 24 and 29 and the shaft 26, illustrated in Fig. 3 by the line marked $a-a$.

The connections 22, rock lever 25, and link 27, form one part of a double toggle mechanism in the position just referred to, which is then substantially straightened out, the link 27 being idle and the motion of the pin 29 is slowed up, and consequently for the time being no motion is imparted to the companion rock member 30. This retarding or slowing up motion is further amplified by said rock member 30 straightening out the supplemental toggles forming the other part of the double toggle mechanism and comprising said rock member and links 31.

Obviously, the relation of all the fulcrums of these double toggle mechanisms is now such that considerable motion of the crank of the crank shaft 6 will impart little or no motion thereto or to the cutting or blanking gate. In theory during the next quarter stroke of the crank this motion is very slight, but for all practical purposes it is a perfect rest. This is demonstrated in Fig. 5 wherein the crank of the crank shaft is in its extreme down position, as well as both gates.

In Fig. 4 the mechanism is shown with the crank moving upwardly, at which time the cutting or blanking gate 56 is also being moved in the same direction. At this time the rock lever 25 has turned about its axis and actuated the link 27 so that it is at substantially a right angle to the direction of motion of the pin 28 and the pin 32 has passed out of its vertical alinement with the pin 33, as shown in Figs. 3 and 5. While approaching this position the cutting or blanking gate moves at an accelerated speed with little or no cramp of the mechanism.

In operation a sheet of metal is fed into the machine over the cutting die 15 and the cutting or blanking gate 56 descends and the cutting punch 14 cuts a blank from the sheet metal and forces it against the upper surface of the drawing die 49 and there holds it under a slight pressure during the dwell portion of the stroke of the cutting or blanking gate 56. The blank in this position is shown by dotted lines in Fig. 7 and designated by the numerals 48.

The plunger or drawing gate 16 carrying the drawing punch 52 and sliding within the tubular member or sleeve 13 has now moved to a position wherein the end of the said punch contacts with said blank. The continued movement of said punch, while the cutting or blanking gate is at rest, forces said blank into the drawing die 49, forming it into a cup shaped article, and at the same time drawing the metal out from under the end of the cutting punch.

When the article is completed both gates move upwardly again, away from the dies, and the ejector 35 lifts the article out of the dies, to be removed, and the above operations are then continued.

Through a cutting or blanking gate actuated in the manner herein described, wherein the force is applied thereto symmetrically and evenly, the end of the cutting punch always maintains a perfect parallel with the drawing die and holds a blank with a constant and uniform pressure at all points against said drawing die, and thus comparatively thin or thick sheet metal is tightly held between parallel surfaces. Such parallel holding is essential to produce perfect results, particularly when thin sheet metal is used. The central and single adjusting means herein shown and described has considerable advantage over the means heretofore employed, whereby a limited adjustment only is obtained by separately adjusting the four corners of the cutting or blanking gate.

By arranging the mechanism symmetrically with the center of the machine, as herein shown and described, any torque or stress is equalized.

The mechanism hereinbefore referred to as a double or double acting toggle mechanism forms an essential part of the present invention and may be more clearly termed a compound toggle mechanism. For convenience, this latter term will be adopted in the appended claims, and it will be understood such mechanism is composed of two parts, one part, referred to as the first part, comprising a member such as or equivalent to connection 22 and lever 25 mounted on a rock shaft or member 26 and having arms at each end thereof, one arm being joined to said connection 22, and which part of the toggle mechanism derives continuous motion from the crank shaft 6 when the machine is in operation. The other, or second part of the toggle mechanism comprises the link 31 and arms 44 and 53, the latter being fixed in relation to each other and the rock shaft or member 34 upon which said arms are mounted. This second part of the toggle mechanism derives motion from the first part of the toggle mechanism through link 27 connecting the free ends of the arms of the two parts of the toggle mechanism together. It will be noted in certain relative positions of the members there is a pronounced lost motion in the link connection between the two parts of the toggle mechanism, therefore, at times, the second part of the toggle mechanism is at rest while the first part is still in motion. The cutting or blanking gate, being operated by the second part of the toggle mechanism obviously when the latter is in a state of rest, there must be a decided dwell in the motion of said gate.

The general construction of the press and operating means, together with the devices designated by the reference letter D, whereby the operator may control the operation of the machine, form no part of the present application.

Since the press herein set forth is of the upright or vertical type, for convenience of illustration, the supporting or suspension shaft 34, being stationary with reference to its distance from the bearings of said crank shaft, relative position is referred to as being vertical, but, obviously, in a horizontal type of press this relative position would be horizontal.

The improved mechanism and means hereinbefore described are capable of use wholly or partly in instances other than stated herein, either as described, or with a modification or modifications, and it is intended that any modification for a similar use or a different use falling fairly within the invention shall be covered by the appended claims.

Having described my invention, what I claim as new and desire to secure by Letters Patent, is:—

1. In a mechanism of the class described, common power transmission means, including a crank shaft, for imparting motion to a pair of elements to cause action thereof in unison or with a substantially retarded movement relatively to each other according to the relative position of operating parts of said power transmission means, said means comprising a system of links and movable members, one part thereof forming a direct connection between one of said elements and the crank shaft and the other part or parts of said means constituting a compound toggle device operating the other of said elements indirectly from said crank shaft, a supporting shaft arranged parallel with said crank shaft and substantially in vertical alinement therewith and providing stationary supporting means for said toggle mechanism, and a rock shaft interposed between said supporting shaft and said crank shaft.

2. In a mechanism of the class described, common power transmission means, comprising a power shaft, a rock shaft substantially parallel therewith, and a stationary supporting shaft arranged in substantially vertical alinement with said power shaft, in combination with means for imparting motion to a pair of movable elements, one element being actuated centrally and directly by said power shaft means, and the other element being operated from two opposite sides by compound toggle mechanism constituting part of said power transmission means, the operation of said elements being substantially in unison or the movement of one element being inconstant relatively to the movement of the other member according to the relative position of the operative parts of said power transmission means.

3. In a mechanism of the class described, a crank shaft, a rock shaft, a stationary shaft, both of said latter shafts arranged substantially parallel to said crank shaft, a system of links and toggles constituting a compound toggle power transmission device supported by said stationary shaft; a plurality of movable elements, one element being actuated directly by said crank shaft and the other element being actuated indirectly by said crank shaft through the medium of said rock shaft and said compound toggle power transmission device in unison with the first element or with a substantially retardative movement relatively to the movement of the first element depending upon the relative position of the operative parts of said compound toggle power transmission device.

4. In a machine of the class described, a crank shaft; a suspension shaft substantially parallel and vertically in alinement with said crank shaft and stationary with reference to its vertical distance from the bearings of said crank shaft; an intermediate rock shaft; a system of links and devices constituting a compound toggle power transmission device; and an operative element of the machine actuated by said power transmission device through said rock shaft.

5. In a mechanism of the class described; a crank shaft; a reciprocal member; a sliding member within said reciprocal member; a rock shaft; a supporting shaft arranged substantially in vertical alinement with said crank shaft; a compound toggle device having one part connected to said reciprocal member and said supporting shaft and the other part being connected to said rock shaft and said crank shaft; and a floating link connection between said parts whereby said toggle mechanism inconstantly imparts motion derived from said crank shaft to said reciprocal member through the medium of said rock shafts; and an operative connection between said crank shaft and said sliding member whereby the same derives motion directly from said crank shaft.

6. In a mechanism of the class described, a crank shaft, a supporting shaft arranged parallel with said crank shaft and substantially in vertical alinement therewith, a compound toggle power transmission device, having said supporting shaft as a stationary support therefor and having companion arms and levers comprising two separate parts of said toggle device and a connection between said parts wherein lost motion is developed at predetermined times dependent of the relative position of said parts.

7. In a power transmission mechanism of the class described; a crank shaft; a rock shaft; a stationary shaft arranged parallel and substantially in vertical alinement with each other; and a system of arms, levers and connection links constituting companion double-acting compound toggle mechanism operating between said crank shaft and said rock shaft and having said rock and supporting shafts as common operative and supporting means.

8. In a mechanism of the class described; a crank shaft; a rock shaft; compound toggle devices suspended from a stationary center located substantially in vertical alinement with said crank shaft and comprising duplicate systems of levers and arms and a lost motion connecting link included in each system whereby constant motion from said crank shaft to said rock shaft is converted into determinable motion inconstant at the point of delivery.

9. In a mechanism of the class described, a crank shaft; a stationary supporting shaft; a rock shaft; companion links and arms operatively connected together by a link developing lost motion during predetermined relative positions of said links and arms and the latter forming compound toggle devices arranged to operate from said supporting shaft and an intermediate rocking member moving with said rock shaft in a manner whereby determinable inconstant motion is imparted to parts of the mechanism relatively to other parts of the mechanism moving constantly.

10. In a mechanism of the class described, a crank shaft; a rock shaft; a stationary shaft; a plurality of arms, levers and links, constituting a compound toggle device supported by said stationary shaft, operated by said crank shaft through said rock shaft and arranged to communicate motion from said crank shaft to actuate one of a pair of movable elements inconstantly relatively to the movement of the other element which derives motion direct from said crank shaft.

11. In a power transmission mechanism, the combination with an operating crank shaft, a stationary supporting shaft, and an intermediate rock shaft; of a system of companion links and levers constituting two sets of double acting compound toggle devices operatively connected with said crank shaft and having said supporting shaft as a common means of support and a pair of movable elements one of said elements being actuated through said rock shaft inconstantly relatively to the movement of the other element which derives constant motion from said crank shaft.

12. In a power transmission mechanism, the combination with a crank shaft, of companion double acting compound toggle devices suspended from a common shaft or center stationary relatively to said crank shaft; a pair of movable members, one member being capable of movement when the other member is substantially in a state of rest, said members having said crank shaft as a common actuating means; and a common rock shaft for said toggle devices located substantially in alinement with said crank shaft and through which rock shaft motion is imparted to one of the said movable members.

13. In a power transmission device; a pair of movable members; a crank shaft; a stationary supporting shaft substantially in vertical alinement with said crank shaft; a rock shaft; a system of links and levers forming double acting compound toggle devices communicating motion from said crank shaft to one of said pair of members, the movement of that member being inconstant relatively to the movement of the other member which derives constant motion directly from said crank shaft; means whereby the first member may be held substantially in a state of rest while the other member is in motion, and said toggle devices operating between two centers constituted by said crank shaft and said stationary shaft.

14. In a machine, the combination of a crank shaft; a suspension shaft providing a stationary center; a rock shaft; compound toggle mechanism transmitting motion from said crank shaft through said rock shaft to one of a pair of operative members of the machine, the other of said members being directly operated by said crank shaft, and said toggle mechanism operating between two centers which are provided by said suspension shaft and said crank shaft and said centers being substantially in the same vertical plane.

15. In a machine, the combination with a crank shaft, a suspension shaft stationary relatively to said crank shaft, and a rock shaft, said shafts being substantially parallel and lying in the same vertical plane; of a compound toggle mechanism supported by said suspension shaft and operated by said crank shaft to transmit motion through said rock shaft; and a sliding member operated by said toggle mechanism in a path substantially in the same vertical plane with all of said shafts.

16. In a machine, the combination of a crank shaft; a stationary supporting shaft; a rock shaft; compound toggle mechanism supported by said stationary shaft and transmitting motion through said rock shaft from said crank shaft to an operative member of the machine, said member being arranged to reciprocate substantially in the same vertical plane as all of said shafts; and said member having an extension located between said crank shaft and said stationary shaft and said member being connected at opposite sides to said toggle mechanism.

17. In a machine, a crank shaft; a stationary shaft and a rock shaft substantially in the same vertical plane with said crank shaft; a system of links and levers, constituting a double acting compound toggle mechanism supported by said stationary shaft and transmitting motion from said crank shaft through said rock shaft to a reciprocating member of the machine pivotally connected on opposite sides to said toggle mechanism.

18. In a machine, a pair of movable members; a crank shaft; a rock shaft; a stationary shaft substantially in vertical alinement with said crank shaft; a system of links and levers constituting a compound toggle mechanism supported by said stationary shaft and transmitting motion through said rock shaft from said crank shaft to one of said pair of movable members and the other member of said pair of members deriving motion through means connected directly to said crank shaft.

19. In a machine, a pair of movable members; an operating crank shaft therefor; a rock shaft; a stationary shaft substantially in vertical alinement with said crank shaft; compound toggle mechanism supported by said stationary shaft and interposed between said crank shaft and said rock shaft and operatively connected at opposite sides to one of said members; and said members being movable one with the other substantially in the same plane as said crank shaft and said rock shaft.

20. In a press of the class described; a body member; a crank shaft mounted within said body member; a rock shaft substantially parallel and in the same vertical plane as said crank shaft; compound toggle mechanism interposed between said crank shaft and said rock shaft; operative members deriving motion from said crank shaft and comprising a blanking or cutting gate, and a plunger or drawing gate, the former member being actuated by said crank shaft through the medium of said toggle mechanism which is operatively connected at opposite sides thereof and the plunger or drawing gate being reciprocated within said former member by means connecting the latter member to the crank shaft.

21. In a press of the class described, a frame; a crank shaft, a relatively stationary shaft and a rock shaft, all having bearings substantially alined with each other in said frame; a reciprocating gate member mounted within said frame; another gate member reciprocating within the first mentioned gate member; and means comprising compound toggle mechanism supported by said stationary shaft and located mainly within said frame substantially in alinement with and on opposite sides of said member whereby said crank shaft through said rock shaft indirectly operates one of said members inconstantly relatively to the constant operation of the other member directly operated by said crank shaft.

22. In a press of the class described, a body member having a frame supporting and substantially inclosing the working elements of the press, such elements comprising a crank shaft; a plunger or drawing gate; a blanking or cutting gate; companion sets of compound toggle mechanism imparting motion to said blanking gate from said crank shaft, said toggle mechanism being operatively connected at opposite sides of said blanking gate, said drawing gate being operated by separate means connected to the crank shaft; and a shaft arranged parallel with said crank shaft substantially in vertical alinement therewith supporting said toggle mechanism.

23. In a press of the class described; a body member; a gate slidably mounted therein; an extension or auxiliary gate connected to and superimposed relatively to said gate and providing an extended bearing therefor; and compound double acting toggle mechanism suspended from a stationary center and operatively connected at opposite sides of said extension.

24. In a press of the class described; a body member; a blanking or cutting gate slidably mounted therein; and an extension or auxiliary gate connected therewith also slidably mounted in said frame, and providing an extended bearing for said blanking or cutting gate; a plunger or drawing gate slidably mounted within said blanking or cutting gate; a crank shaft; a rock shaft arranged parallel with said crank shaft; and compound toggle mechanism operatively connected at both sides of said extension or auxiliary gate transmitting motion thereto from said crank shaft through the medium of said rock shaft, said motion being inconstant relatively to motion imparted directly to said plunger or drawing gate by said crank shaft.

25. In a press of the class described; a body member forming an inclosing frame; a power shaft, a stationary supporting shaft and a rock shaft mounted and arranged within said frame substantially parallel with each other; a pair of operative members; power transmitting means comprising a system of arms, levers and connecting devices, constituting compound toggle mechanism and suspended from said supporting shaft; and a power shaft separately operating said operative members, one member being operated inconstantly through the medium of said power transmitting means and the other of said members being operated constantly by said power shaft through said rock shaft and said power transmitting means being contained mainly within said frame and connected at opposite sides of one of said operative members.

26. In a press of the class described; a body member constituting a substantially parallelogrammic rectangular open frame substantially inclosing the working elements of the press, said elements comprising compound toggle mechanism, a power shaft, a rock shaft arranged parallel with said power shaft and a pair of operative members, one of said members being operated by said power shaft through the medium of said rock shaft and said toggle mechanism, in a manner whereby the member so operated may remain substantially in a state of rest while the other member, operated directly by said power shaft, is still in motion, and said toggle mechanism being equally disposed at opposite sides of said operative member whereby an equalization of the distribution of power is maintained.

27. In a press of the class described, a body member forming a frame having an opening between the sides thereof; a compound toggle mechanism; a crank or power shaft; a rock shaft arranged parallel with the aforesaid shaft; a pair of movable members having as a common operating means said crank or power shaft and one of said members being operated inconstantly through the medium of said rock shaft and said toggle mechanism in a manner whereby movement of the member so operated is periodically discontinued at predetermined times and said toggle mechanism being supported by a common shaft and arranged parallel with said crank or power shaft substantially in vertical alinement therewith, said toggle mechanism being located mainly within said frame at two opposite sides of the member operated thereby.

28. In a press of the class described, a body member, having an open frame; a main shaft; power transmission means comprising two sets of compound toggle mechanism; a common rock shaft for said toggle mechanism arranged parallel with said main shaft; a supporting shaft for said toggle mechanism arranged parallel with said main shaft substantially in vertical alinement therewith; a pair of working elements deriving motion from said crank shaft or power element, one member being operated through the medium of said toggle mechanism in a manner so that the movement of the member so operated is retarded or discontinued while the movement of the other member continues, and said power transmitting means being mounted and operating within said frame substantially in the same plane as the path of movement as said working members.

29. In a press of the class described, a body member having an open frame; a main shaft; power transmission means comprising compound toggle mechanism, of which one part at predetermined times remains idle while the other part is still active; a common supporting shaft for said toggle mechanism arranged parallel with said main shaft substantially in vertical alinement therewith; a common rock shaft to which motion is transmitted from said main shaft through said toggle mechanism to operate one of a pair of operative machine elements, and the other element being actuated by said main shaft directly through separate connecting means.

30. In a machine of the class described; a body; standards constituting a frame and defining an inclosure; a power shaft; power transmitting means comprising a rock shaft arranged parallel with said power shaft; oppositely arranged sets of compound toggle mechanism; a common supporting shaft for said mechanism arranged parallel with said power shaft substantially in vertical alinement therewith and a pair of machine elements, one of which is operated directly by said power shaft and the other by said power shaft through said means and all of said shafts and means being arranged mainly within said inclosure.

31. In a machine of the class described, the combination with a body member having standards constituting a frame and defining an inclosure; a crank shaft; a suspension shaft stationary relatively to said crank shaft and substantially in alinement therewith, and having rocking members mounted thereon; an intermediate rock shaft having companion rock arms mounted thereon, said rock shaft and rock arms being movable about an axis substantially parallel with and in the same plane as the axis of said crank shaft; a pair of gates or members mounted so as to move one within the other; a single operating connection between one of said gates and said crank shaft; toggle connecting devices between the other of said gates and said rocking members on said suspension shaft; another toggle connection device between said crank shaft and said rock arms on said rock shaft, said toggle devices being link connected together so as to permit lost motion between the sets of toggle devices at predetermined times, and said toggle mechanism being contained mainly within said inclosure.

32. In a device of the character described, the combination with a body member having standards constituting a frame and an inclosure; a crank shaft; a relatively stationary shaft; an intermediate rock shaft; companion rock levers mounted on said stationary shaft, both said stationary shaft and rock levers turning on the same axis substantially parallel with and in the same plane as the axis of said crank shaft; companion gates mounted so as to move one within the other; a single connection between one of said gates and said crank shaft; companion toggle connections between the other of said gates and said stationary shaft; additional companion toggle connections between said intermediate rock shaft and said crank shaft; a link connection between the sets of toggle connections developing lost motion between the same at predetermined times and all of said toggle connections being located symmetrically on two opposite sides of said gates and mainly within said inclosures.

33. In a machine of the class described, the combination with a body member having standards constituting a frame and defining an inclosure; of a crank shaft, a rock shaft and a supporting shaft all of which are journaled in said frame parallel to each other and substantially in the same vertical plane, and compound toggle power transmitting mechanism imparting inconstant motion to one of said members through said rock shaft from said crank shaft and having said supporting shaft as a common means of support and said transmitting mechanism being located mainly within said inclosure equally on two sides of the gate member operated thereby.

34. In a machine of the class described, the combination with a body member having a supporting frame which defines an inclosure; of a crank shaft, an intermediate rock shaft or member and a relatively stationary suspension shaft journaled in said frame, said suspension shaft lying parallel with said crank in substantially the same plane therewith; a blanking gate member slidably mounted within said frame and operated by said crank shaft through said rock shaft; a drawing gate member slidably mounted within the blanking gate member and operated directly by said crank shaft; compound toggle mechanism having said suspension shaft as a common suspending means and said mechanism communicating the motion derived from said crank shaft through said rock shaft to said blanking gate member and all of the aforesaid elements being mainly contained within said inclosure and arranged symmetrically with relation to each other.

35. In a machine of the class described, the combination with a body member supporting a frame which defines an inclosure; of a crank shaft, an intermediate rock shaft and a suspension shaft mounted within said frame; a gate member slidably mounted within said frame; power transmitting means, comprising compound double acting toggle mechanism located mainly within said inclosure and suspended from a stationary center provided by said suspension shaft, said mechanism being operatively connected at two opposite sides of said gate member so as to transmit equalized power thereto from said crank shaft and so as to impart inconstant motion to said gate member relatively to said crank shaft; and another gate member slidably mounted within the first mentioned gate member and operatively connected with said crank shaft so as to move constantly therewith.

36. The combination with a crank shaft, a suspension shaft and an intermediate rock shaft; of a reciprocal member; a compound toggle device suspended from a stationary center provided by said suspension shaft and transmitting motion indirectly from said crank shaft through said rock shaft to said member, one part of said toggle mechanism comprising a rocking member mounted on said rock shaft and operatively connected to said crank shaft and the other part of said compound toggle mechanism comprising a rocking member mounted on said suspension shaft and having arms which are connected by links respectively to the said reciprocal member and to the rocking member of the first mentioned part of the said toggle mechanism.

In testimony whereof I have hereunto affixed my signature.

ZENAS P. CANDEE.